US008934246B1

(12) United States Patent
Keig

(10) Patent No.: US 8,934,246 B1
(45) Date of Patent: Jan. 13, 2015

(54) MODULAR MOTOR CONTROL UNIT FOR MARINE USE

(71) Applicant: James Nelson Keig, Houston, TX (US)

(72) Inventor: James Nelson Keig, Houston, TX (US)

( * ) Notice: Subject to any disclaimer, the term of this patent is extended or adjusted under 35 U.S.C. 154(b) by 209 days.

(21) Appl. No.: 13/734,575

(22) Filed: Jan. 4, 2013

(51) Int. Cl.
*H05K 5/00* (2006.01)
*H05K 7/20* (2006.01)
*G06F 1/20* (2006.01)
*H05K 5/06* (2006.01)

(52) U.S. Cl.
CPC ........................................ *H05K 5/069* (2013.01)
USPC .............................. 361/701; 361/690; 361/699

(58) Field of Classification Search
USPC .......................................... 361/690, 699, 701
See application file for complete search history.

(56) References Cited

U.S. PATENT DOCUMENTS

| | | | |
|---|---|---|---|
| 7,110,260 B2 * | 9/2006 | Weber et al. | 361/700 |
| 8,125,777 B1 * | 2/2012 | MacLennan et al. | 361/689 |
| 2005/0243519 A1 * | 11/2005 | Weber et al. | 361/699 |
| 2014/0146469 A1 * | 5/2014 | Frey et al. | 361/690 |

* cited by examiner

Primary Examiner — Anthony Haughton
(74) Attorney, Agent, or Firm — Buskop Law Group, PC

(57) ABSTRACT

A variable frequency drive system for use with a motor on an offshore platform having a variable frequency drive unit connected with a cooling unit. The variable frequency drive unit includes a climate controlled and sealed housing, a framework, a power input, a power output, a main circuit breaker, a power converter module, an autoswitchable transformer, an auxiliary power system, an output filter, and an air conditioning unit. The cooling unit includes a heat exchanger, a multistage centrifugal pump, a fresh water outlet, a mixing valve, and a process logic controller connected to a pair of temperature probes. The variable frequency drive system provides a drive system that is reliable and modular, allowing for versatility in placement on an offshore rig.

11 Claims, 9 Drawing Sheets

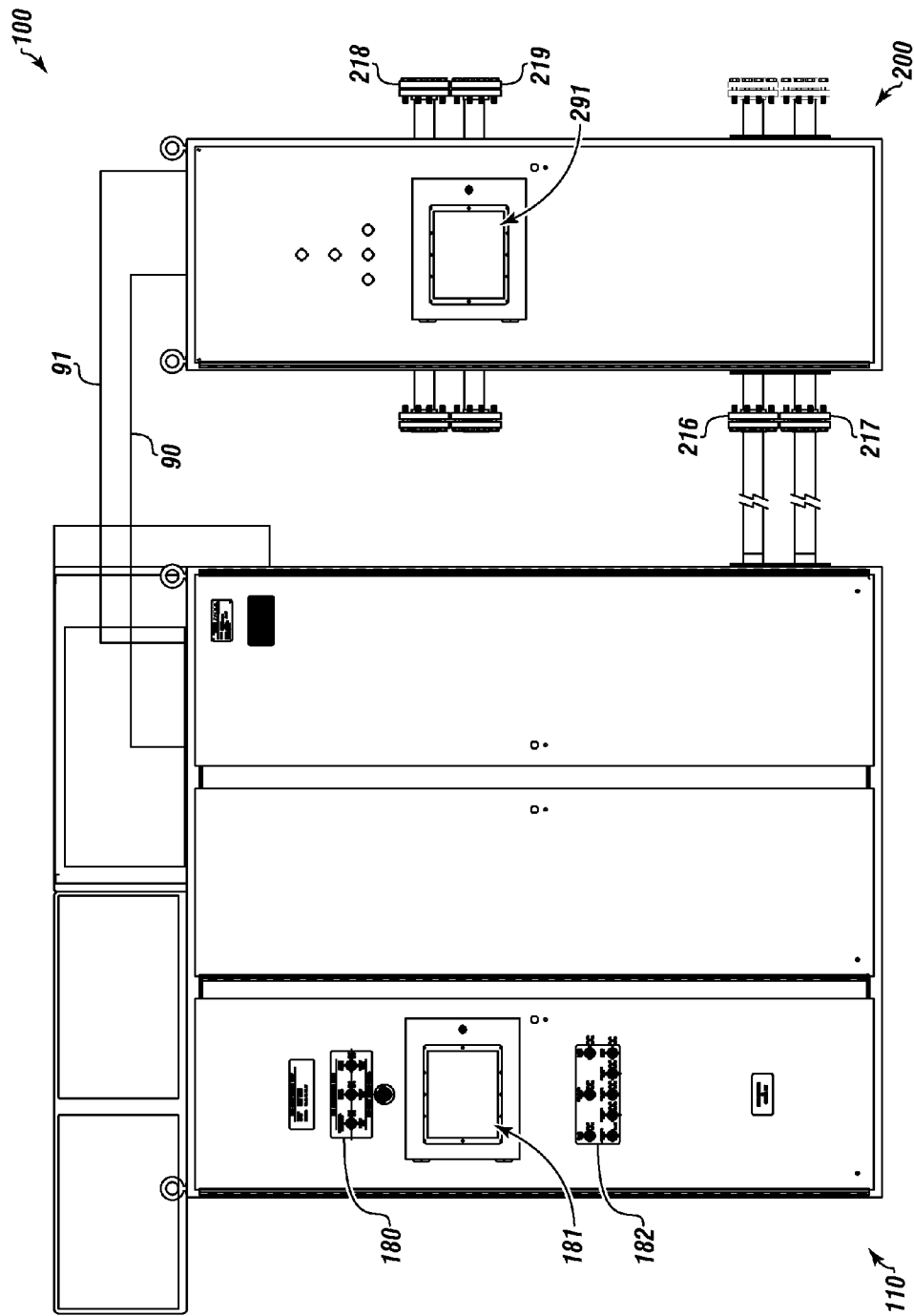

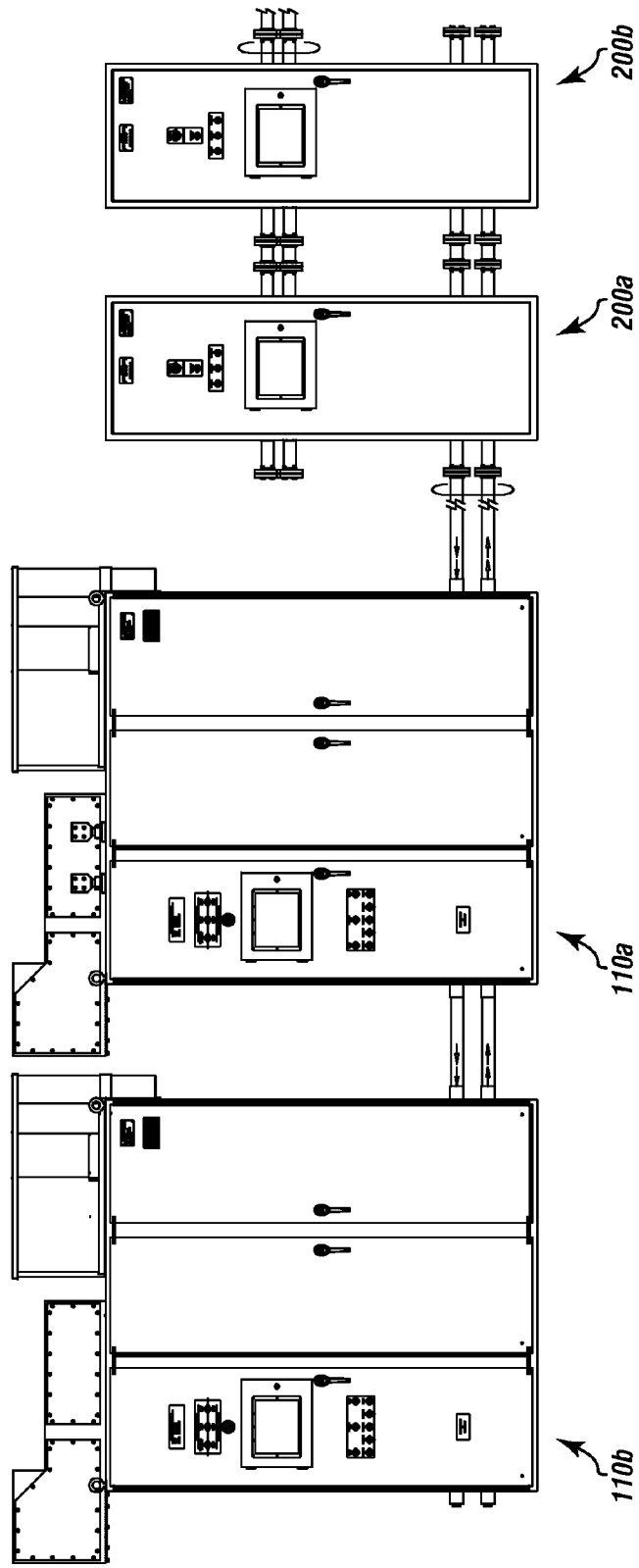

MODULAR MOTOR CONTROL UNIT FOR MARINE USE

FIELD

The present embodiments generally relate to a variable frequency drive system for use with a motor on an offshore platform.

BACKGROUND

A need exists for a variable frequency drive system for use with a motor on an offshore platform that can be placed close to an end use, thereby, reducing the amount of special shielded cable needed to mitigate the effects of high-frequency switching. The ability to reduce the amount of cable needed greatly reduces costs associated with building offshore equipment using variable frequency drives.

A need exists for a variable frequency drive system for use with a motor on an offshore platform that is modular and can be placed anywhere on the offshore rig without the need to build special structures on the offshore rig.

A need exists for a variable frequency drive system for use with a motor on an offshore platform that prevents down time because the variable frequency drive can be purpose built due to its modularity.

The present embodiments meet these needs.

BRIEF DESCRIPTION OF THE DRAWINGS

The detailed description will be better understood in conjunction with the accompanying drawings as follows:

FIG. 1 depicts a schematic of a variable frequency drive system.

FIG. 8 depicts a schematic of the variable frequency drive system having multiple variable frequency drive units and the cooling units.

Figure 2A:
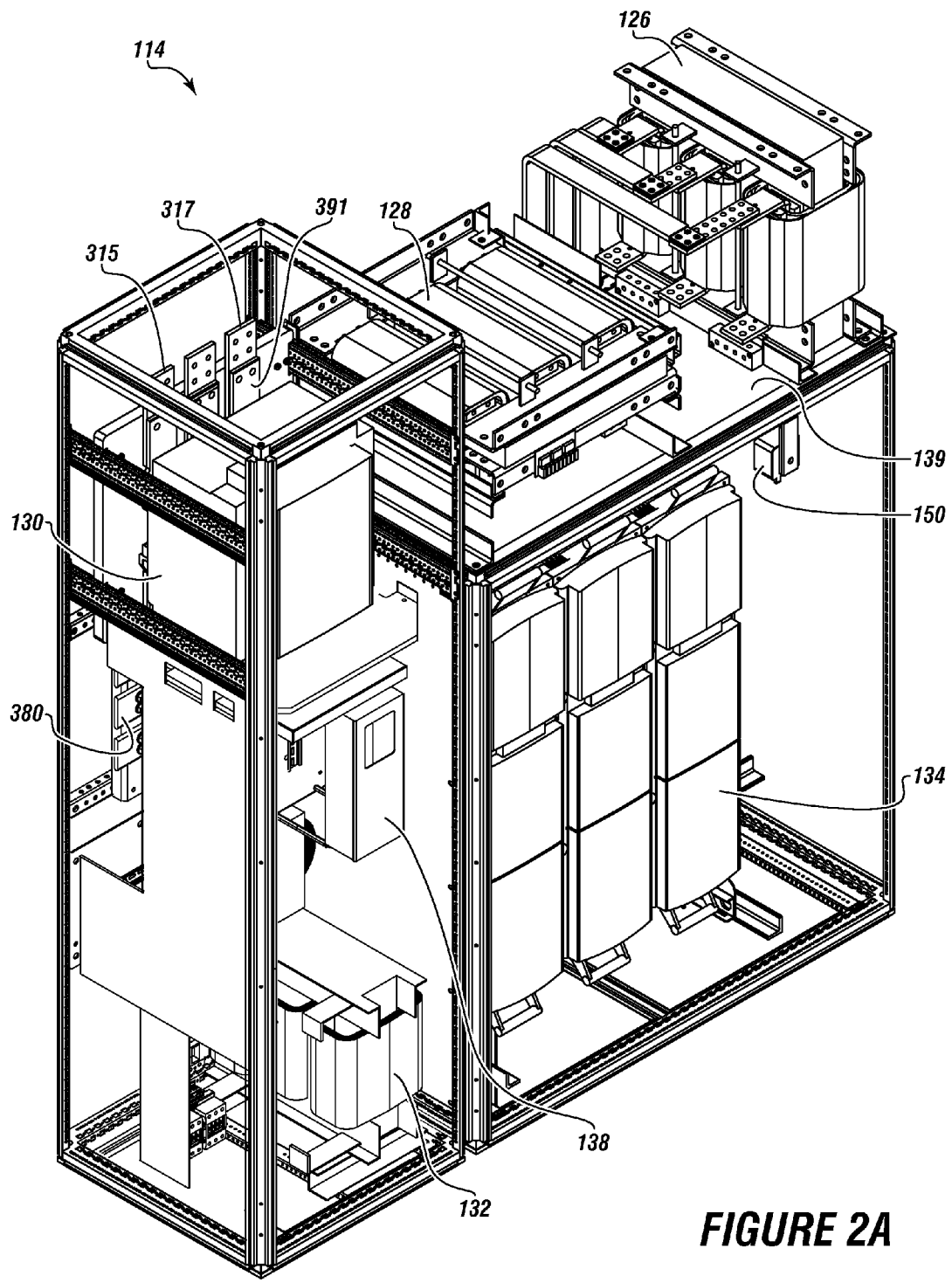
FIGS. 2A and 2B depict a framework of the variable frequency drive unit.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments generally relate to variable frequency drive system for use with a high torque induction motor on an offshore platform.

The variable frequency drive system can include a variable frequency drive unit and a cooling unit. The cooling unit can be placed proximate to the variable frequency drive unit or remote from the variable frequency drive unit.

The variable frequency drive unit can include a climate controlled and sealed housing. The climate controlled and sealed housing can be made from weather and corrosion resistant material. Illustrative materials can include grade 304 stainless steel, grade 316c stainless steel, or the like.

A power input can be connected with the climate controlled and sealed housing. The power input can be a bus or other connector for connecting with an electric conductor in communication with a power source.

A power output can be connected with the climate controlled and sealed housing. The power output can be a bus or other connector for connecting with a motor that is controlled by the variable frequency drive unit. The motor can be a cement pump motor, a mud pump motor, a top drive motor, or the like.

An air conditioning unit can be connected with the climate controlled and sealed housing. The air conditioning unit can control the humidity and temperature within the climate controlled and sealed housing. The air conditioner operational status feeds back to a master control system of the variable frequency drive system, allowing for the variable frequency drive unit to be locked out if the cabinet humidity level exceeds ninety-five percent.

A framework can have the master control system, a main circuit breaker, a power converter module, an autoswitchable transformer, an auxiliary power system, an output filter, an input filter, a spill pan, and a drain connected therewith when the framework is outside of the climate controlled and sealed housing. After the equipment is installed on the framework, the framework can be placed within the climate controlled and sealed housing.

The master control system can control the operation of the variable frequency drive system and can shut down the variable frequency drive unit, the cooling unit, or both if a problem is detected.

The main circuit breaker can be an insulated case or molded case circuit breaker. The main circuit breaker can cut power to all components of the variable frequency drive unit if a malfunction occurs. The main circuit breaker can be in electric communication with the power input.

The power converter module can be connected with the main circuit breaker. The power converter module can be a commercially available power converter module. Illustrative industrial power converters can be those sold by ABB™ and VACON™ as trade names ACS800™ and NXP™, respectively.

The auxiliary power system can provide power to the air conditioning unit and other components of the variable frequency drive unit that require power, such as a blower and heater.

The autoswitchable transformer can be connected with the power input and the auxiliary power system. The autoswitchable transformer can be in communication with a voltage detection relay that determines the voltage provided to the power input and opens one of two paths to maintain the proper auxiliary voltage within the variable frequency drive unit. The autoswitchable transformer can determine if the voltage is 600 volts or 690 volts.

The input filter can be connected between the main circuit breaker and the power converter module to protect the upstream circuit. The input filter conditions the power as it is provided to the power converter module. Accordingly, the input filter can reduce higher-frequency noise propagation into the power converter module. The input filter can be an inductor. The input filter can be water cooled to reduce A/C load.

The output filter can be connected with the power converter module and the power output. The output filter can filter the power before it is provided to the power output. The output filter can reduce effects of EMI and voltage spikes caused by the power converter module. Reducing the effects of EMI and voltage spikes provides for safer operation of the variable frequency drive unit because it prevents the variable frequency drive unit from interfering with other electric drive systems on the offshore rig. The output filter can be an LC filter. The output filter can be water cooled.

The spill pan can be aligned with the input filter and the output filter. The spill pan can protect the power converter module if the cooling systems of the input filter and the output filter develop a leak.

A drain can be located in the spill pan. The drain can be in fluid communication with a bottom portion of the climate controlled and sealed housing. A leak detector can be located at the bottom of the climate controlled housing proximate the drain. The leak detector can trip the main circuit breaker upon detection of a leak.

A fuse set can be connected between the input filter and the power input and between the input filter and the power converter module. The fuse set can be fast acting to limit fault energy in the variable frequency drive unit.

The cooling unit can have a fresh water inlet and a fresh water outlet in fluid communication with the variable frequency drive unit. The fresh water outlet can provide process water to the variable frequency drive unit for cooling the input filter and the output filter. The process water can extract heat from the input filter and output filter and return to the cooling unit via the fresh water inlet.

A multistage centrifugal pump can be located in the cooling unit and connected with the fresh water inlet and can provide pump head to the process water in the fresh water inlet to circulate the process fluid through the cooling unit and the variable frequency drive unit.

The cooling unit can include a process logic controller in communication with a pair of temperature probes. The temperature probes can acquire data on the temperature of the process water in the fresh water outlet and the fresh water inlet.

The process logic controller can then adjust a mixing valve located between the fresh water inlet and a heat exchanger to control the amount of process water sent to the heat exchanger. The amount of process water sent to the heat exchanger is determined by the temperature of the process water in the fresh water inlet and the fresh water outlet. Accordingly, the mixing valve is adjusted to maintain the temperature of the process water in the fresh water outlet within a predetermined temperature range.

For example, the mixing valve can be adjusted to provide all of the process water in the fresh water inlet to the heat exchanger if the process water in the fresh water inlet is at 75 degrees Fahrenheit and the predetermined temperature range for the process water in the fresh water outlet is 40 degrees Fahrenheit to 45 degrees Fahrenheit. In contrast, the mixing valve can be adjusted to bypass the heat exchanger if the temperature of the process water in the fresh water inlet is 35 degrees Fahrenheit and the predetermined temperature range for the process water in the fresh water outlet is 40 degrees Fahrenheit to 45 degrees Fahrenheit. Of course, the mixing valve can also be adjusted to provide a portion of the process water to the heat exchanger.

The process logic controller can determine how to adjust the mixing valve using software programmed to compare the data acquired by the first temperature probe and the second temperature probe to the predetermined temperature range, calculate the heat transfer through the heat exchanger, and determine the volume of process water in the fresh water inlet that needs to be cooled to maintain the process water in the fresh water outlet within the predetermined range; these operations would be known to one skilled in the art with the aid of this disclosure.

The process logic controller can also be in communication with a first flow meter in the variable frequency drive unit for acquiring data on the flow rate of the process fluid out of the fresh water outlet. A second flow meter in the cooling unit for acquiring data on the flow rate of process water in the fresh water inlet can also be in communication with the process logic controller. The process logic controller can use the acquired data on the flow rates to calculate the rate of heat transfer through the heat exchanger.

The process logic controller can be in communication with the master control system. The process logic controller can send a shutdown signal to the master control system if the first flow meter, the second flow meter, or both detect a zero flow rate for the process water. In one or more embodiments, the first flow meter, the second flow meter, or both can be in direct communication with the master control system and the master control system can shut down the variable frequency drive system if the first flow meter, the second flow meter, or both detect a zero flow rate for the process water.

A de-airing valve can be disposed between the heat exchanger and the fresh water outlet.

A control system can be in communication with the variable frequency drive unit. The control system can adjust the variable frequency drive unit based on data acquired from a motor that is being controlled by the variable frequency drive unit. The data can include the temperature, speed, torque, or the like of the motor. The control system can communicate with the variable frequency drive unit via the master control system. The control system can have a built in interface for communicating with the master control system through one or more gateway protocols.

Turning now to the Figures, FIG. 1 depicts a schematic of a variable frequency drive system.

The variable frequency drive system 100 can include a variable frequency drive unit 110 and a cooling unit 200.

The variable frequency drive unit 110 and the cooling unit 200 can communicate with one another via a signal line 90. The signal line 90 can represent wireless communication, wired communication, or both.

A power conductor 91 can provide power from the variable frequency drive unit 110 to the cooling unit 200. The power conductor 91 can be any cable or device capable of transferring electricity from a source to an end use.

The cooling unit 200 can include a cooling unit display 291. The cooling unit display 291 can provide information on the operation of the cooling unit 200 to an operator. The cooling unit display 291 can be any display device.

The cooling unit 200 can include a fresh water outlet 216. The fresh water outlet 216 can provide process water to the variable frequency drive unit 110. The process water can be used to extract heat from one or more components within the variable frequency drive unit 110.

The cooling unit 200 can also include a fresh water inlet 217. The fresh water inlet 217 can be in communication with the variable frequency drive unit 110. The fresh water inlet 217 can circulate the process fluid back to the cooling unit 200.

The cooling unit 200 can use seawater provided from a seawater inlet 219 to cool the process water. The cooling unit 200 can have a seawater outlet 218 for removing the seawater from the cooling unit 200.

The variable frequency drive unit 110 can include a master control interface 180. The master control interface 180 can receive input from an operator, a control system, or both.

The variable frequency drive unit 110 can also include a master control display 181. The master control display 181 can display information related to the operation of the variable frequency drive system 100.

The variable frequency drive unit 110 can include system status indicator lights 182.

The system status indicator lights 182 can display different colors to visually indicate the operation of the variable frequency drive system 100. For example, the system status indicator lights 182 can all display a green light if the variable frequency drive system 100 is operating properly.

Figure 2B:
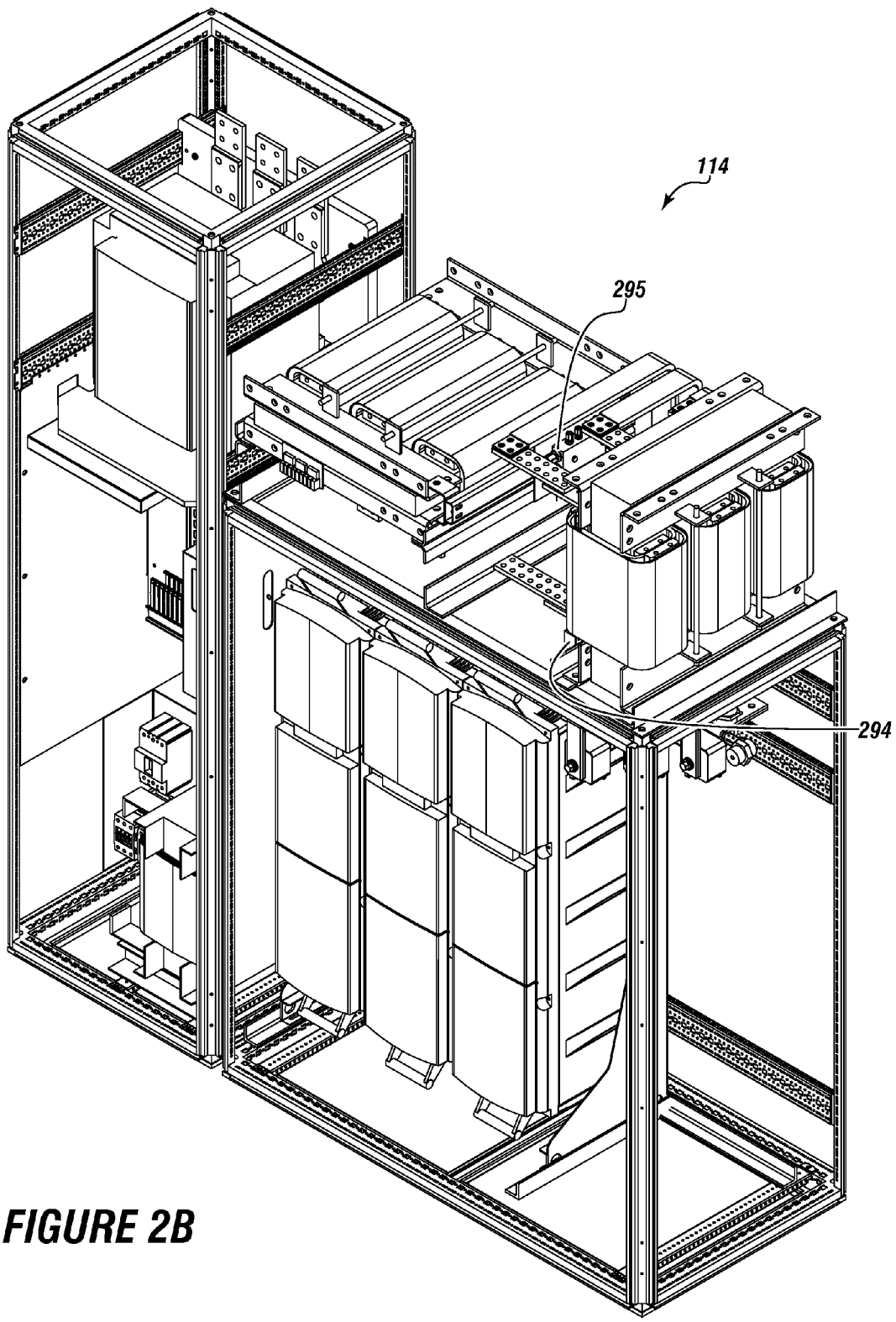
Figure 3:
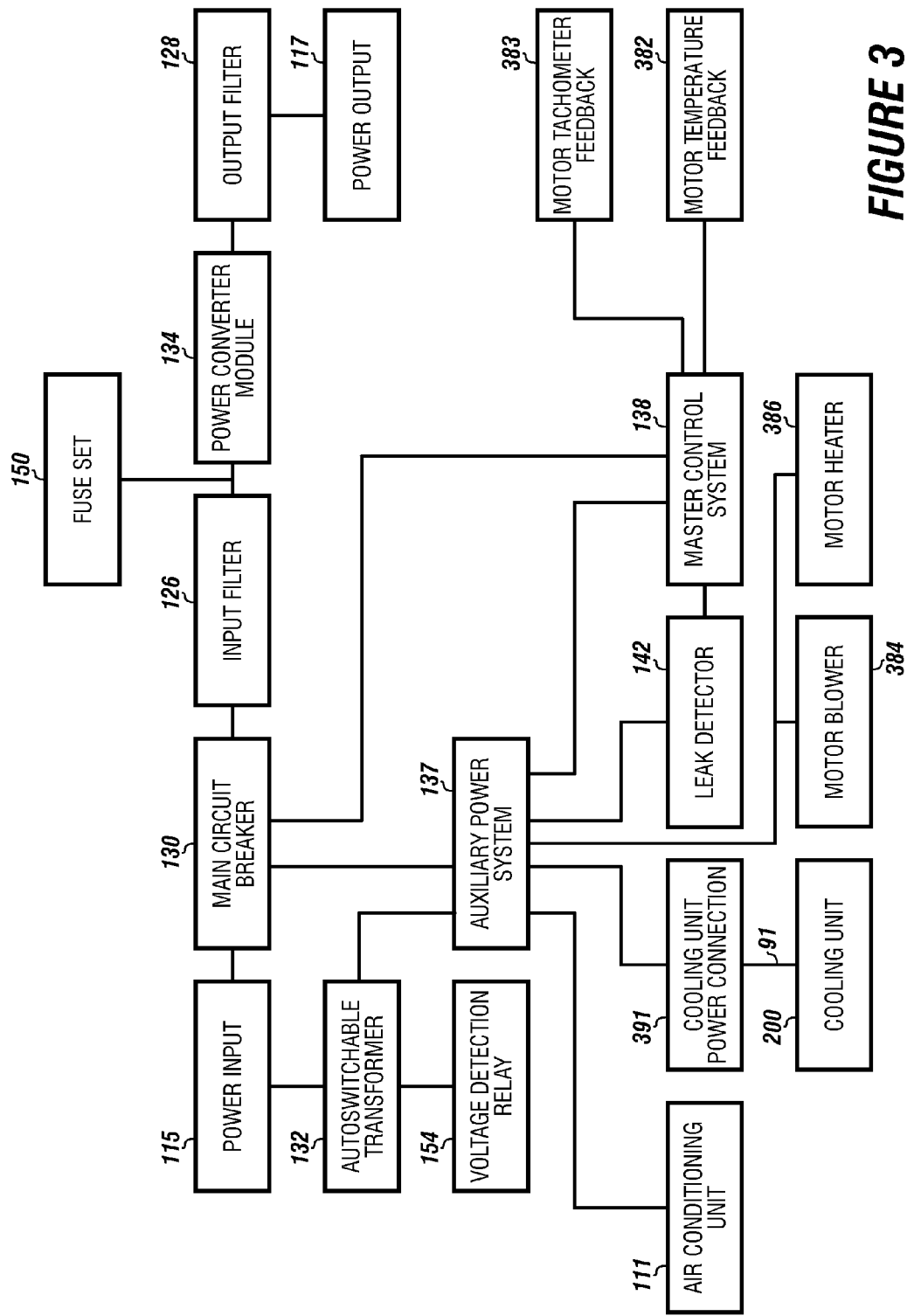
FIG. 3 depicts a schematic of electric connection between components connected with the framework.
Figure 4:
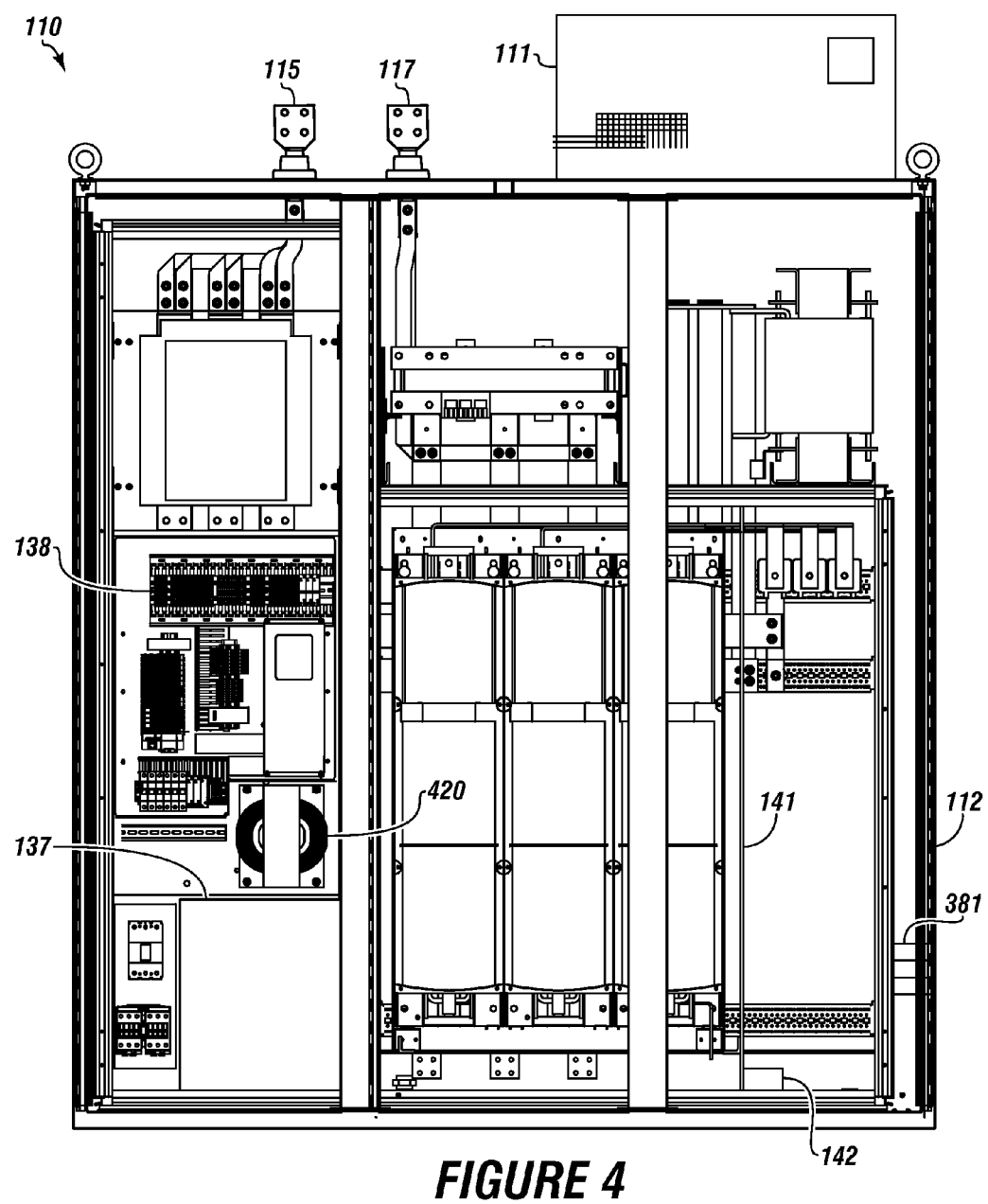
FIG. 4 depicts the variable frequency drive unit with the framework located therein, wherein a portion of a climate controlled and sealed housing is removed depicting the interior thereof.

FIGS. 2A and 2B depict a framework of the variable frequency drive unit from two different angles. FIG. 3 depicts a schematic of electric connection between components connected with the framework. FIG. 4 depicts the variable frequency drive unit with the framework located therein, wherein a portion of a climate controlled and sealed housing is removed depicting the interior thereof.

Referring to FIGS. 2A, 2B, 3, and 4, the variable frequency drive unit 110 can include the framework 114 and the climate controlled and sealed housing 112.

The framework 114 can have a cooling unit power connection 391, a main circuit breaker 130 that can be demountable, an autoswitchable transformer 132, an output filter 128, an input filter 126, a power converter module 134, a power input connection 315, a power output connection 317, a spill pan 139, a master control system 138, an auxiliary power system 137, a drain 141, a manifold 381, one or more power connectors 380, and a fuse set 150 secured thereto.

An air conditioning unit 111 can be connected with the climate controlled and sealed housing 112. A power input 115 can be connected with the climate controlled and sealed housing 112 and in electric communication with the main circuit breaker 130.

A power output 117 can be connected with the climate controlled and sealed housing 112 and in electric communication with the output filter 128.

The power connectors 380 can provide communication between components on the framework 114.

The fuse set 150 can protect the electronic components within the power converter module 134.

The auxiliary power system 137 can be in communication with the main circuit breaker 130. The auxiliary power system 137 can provide power to the master control system 138, the cooling unit power connection 391, and a leak detector 142. In one or more embodiments, a motor blower 384 and motor heater 386 can be installed in the variable frequency drive system and the auxiliary power system 137 can provide power to them.

The auxiliary power system 137 can be in communication with a voltage detection relay 154. The voltage detection relay 154 can determine if the power provided to the variable frequency drive unit 110 is high (690V) or low (600V) and can cause the autoswitchable transformer 132 to open or close a path accordingly.

The cooling unit power connection 391 can connect with the power conductor 91, and the power conductor 91 can provide power to the cooling unit 200.

The manifold 381 can be in communication with the fresh water outlet and provide communication between multiple flow paths throughout the climate controlled and sealed housing 112.

The manifold 381 can be in communication with the fresh water inlet and provide consolidated return flow paths into one flow path allowing all process water to be cycled back to the cooling unit via the fresh water inlet.

The spill pan 139 can be operatively arranged on the framework 114 to protect the power converter module 134 if a leak occurs in the water cooling system. The drain 141 can be in communication with the spill pan 139 and a lower portion of the climate controlled and sealed housing 112. The leak detector 142 can be operatively aligned about the framework to detect process water traversing the drain 141. The leak detector 142 can send a signal to the master control system 138 if process water is detected, and the master control system 138 can issue a shutdown command; thereby, shutting down the variable frequency drive unit 110 and the cooling unit 200.

A process water outlet filter 295 can be operatively connected with the framework 114. A process water input filter 294 can be operatively connected with the framework 114.

In one or more embodiments, the master control system 138 can be in communication with a motor tachometer feedback 383. The motor tachometer feedback 383 can be connected with a motor or part of the motor driven by the variable frequency drive system. The master control system 138 can also be in communication with a motor temperature feedback 382. The motor temperature feedback 382 can be connected with a motor or part of the motor driven by the variable frequency drive system.

An auxiliary autoswitchable transformer 420 can be installed in the variable frequency drive unit 110. The autoswitchable transformer 132 can be for 480 volt power, whereas auxiliary autoswitchable transformer 420 can be for 120 volt power.

Figure 5:
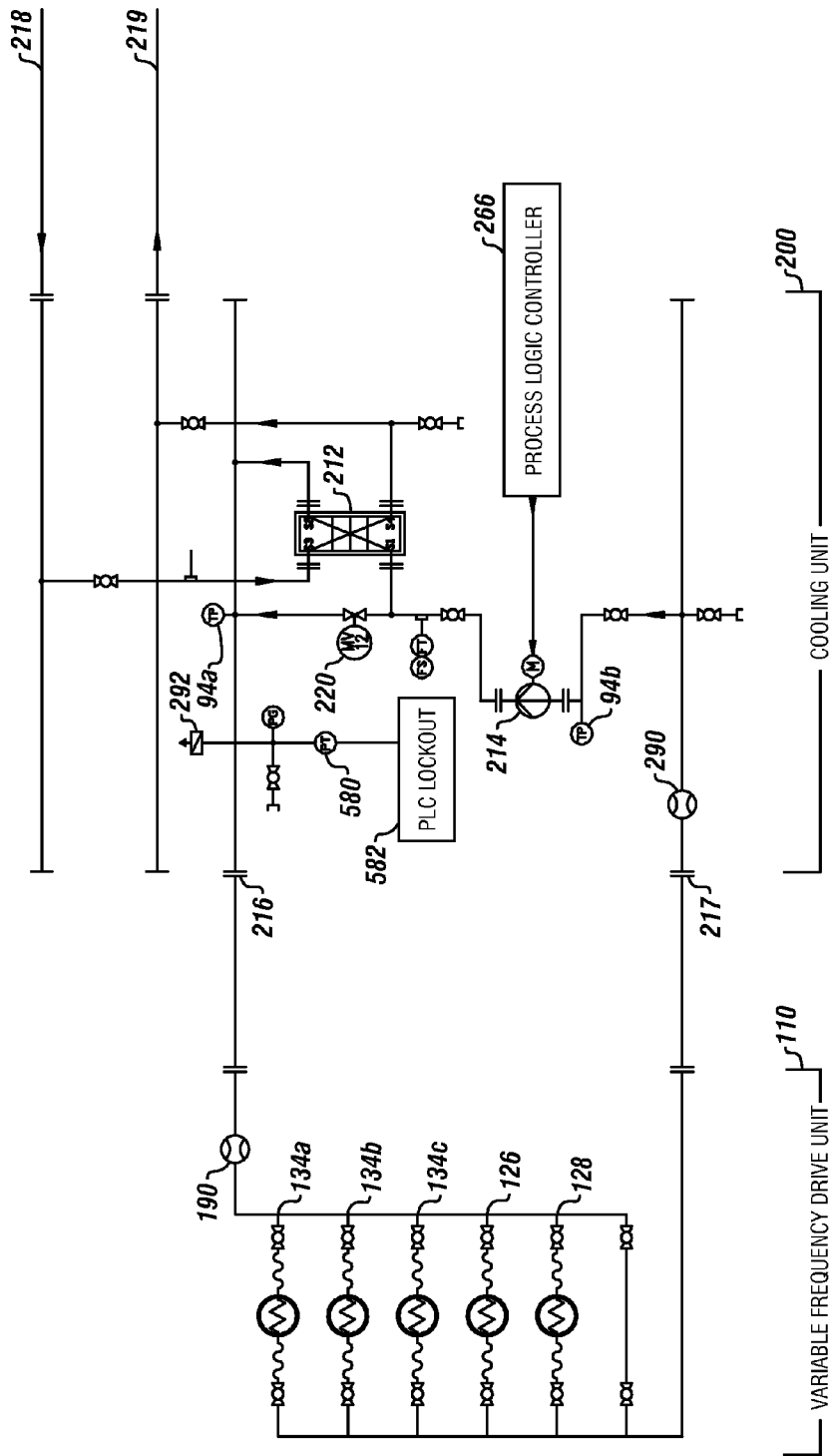
FIG. 5 depicts a schematic of the cooling unit.
Figure 6:
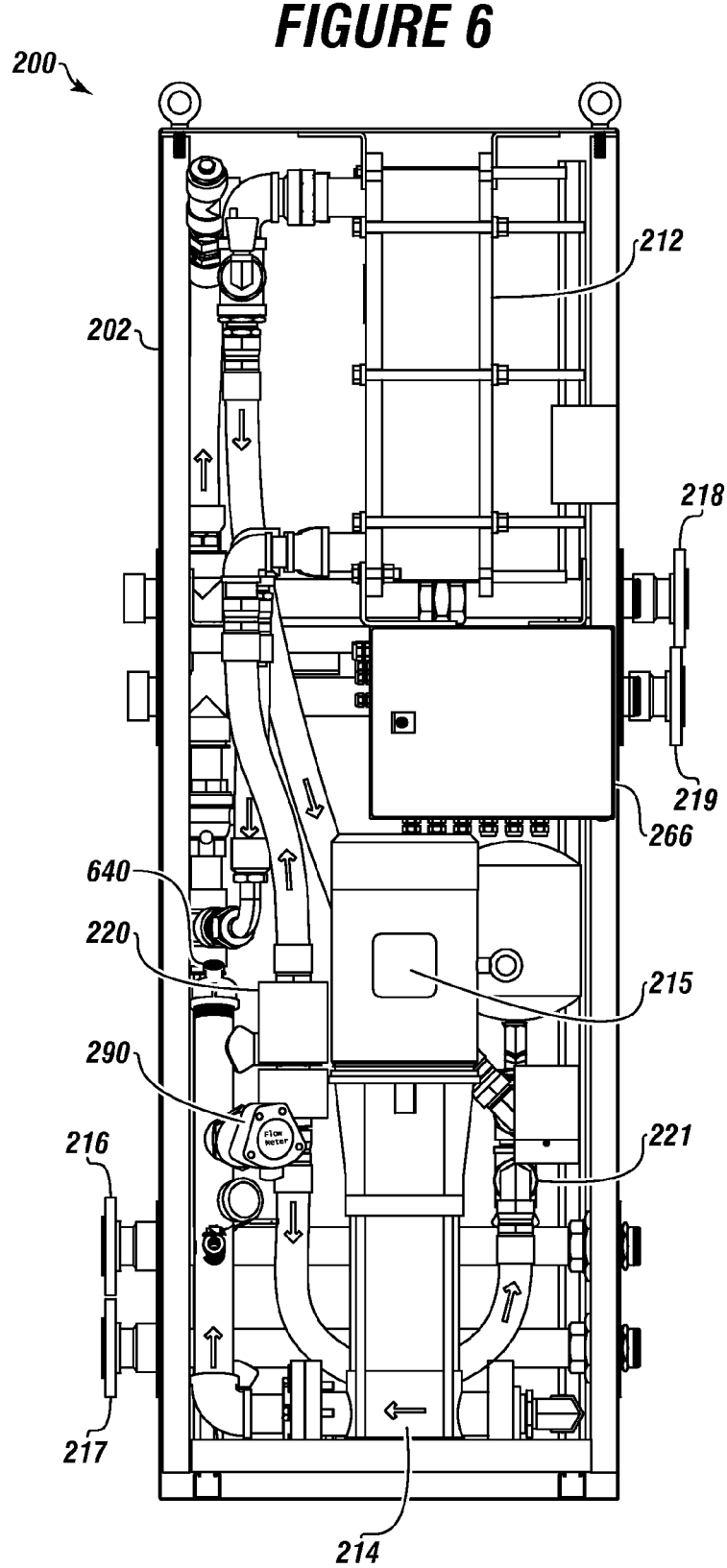
FIG. 6 depicts an inside front view of the cooling unit.

FIG. 5 depicts a schematic of the cooling unit. FIG. 6 depicts an inside front view of the cooling unit.

Referring to FIGS. 5 and 6, the cooling unit 200 can have a cooling unit housing 202. The cooling unit housing 202 can contain a heat exchanger 212, a multistage centrifugal pump 214, a pump motor 215, a mixing valve 220, a process logic controller 266, a second flow meter 290, pair of temperature probes 94a, 94b, and a de-airing valve 292.

A pressure relief valve 640 can be operatively disposed within the cooling unit 200.

The seawater inlet 219 can be located on the cooling unit housing 202. The seawater inlet 219 can be in fluid communication with an inlet of the heat exchanger.

The seawater outlet 218 can be located on the cooling unit housing 202. The seawater outlet 218 can be in fluid communication with a cooling fluid outlet of the heat exchanger.

The seawater inlet 219 can provide the cooling fluid to the heat exchanger, and the cooling fluid can extract heat from the process fluid flowing into the heat exchanger from the fresh water inlet 217.

The multistage centrifugal pump 214 can be driven by the pump motor 215. The multistage centrifugal pump 214 can provide pump head to the process fluid in the fresh water inlet 217.

The mixing valve 220, such as a three way mixing valve, can be selectively operated to (1) provide all of the process water in the fresh water inlet to the heat exchanger 212; (2) provide a first portion of the process water in the fresh water inlet to the heat exchanger 212 and bypass a second portion of the process water in the fresh water inlet to a mixing zone 221 for mixing with process water in the fresh water outlet 216; (3) bypass the heat exchanger 212 and mix the process water in the fresh water inlet with the process water in the fresh water outlet in the mixing zone 221.

The process logic controller 266 can control the operation of the pump motor 215 to ensure a proper flow rate out of the fresh water outlet 216. The process logic controller 266 can control the pump motor 215 based on data acquired by the first flow meter 190, the second flow meter 290, or both. The first flow meter 190 can be in the variable frequency drive unit 110.

The process water in the fresh water outlet 216 can be used to cool one or more power converter modules 134a, 134b, 134c, the input filter 126, and the output filter 128.

The process logic controller 266 can also control the mixing valve 220. The process logic controller 266 can control the operation of the mixing valve 220 based on data acquired by the first temperature probe 94a and the second temperature probe 94b.

The de-airing valve 292 can be operatively located between the fresh water outlet 216 and the heat exchanger 212. The de-airing vent 292 can at least reduce air bubbles in the process water provided to the fresh water outlet 216.

A pressure transducer 580 can be located in the variable frequency drive system to detect the pressure of the process water in the fresh water outlet 216. The pressure transducer 580 can be in communication with a PLC lockout 582. The PLC lockout 582 can shut down the variable frequency drive system if the pressure in the fresh water outlet is less than a predetermined value.

Figure 7:
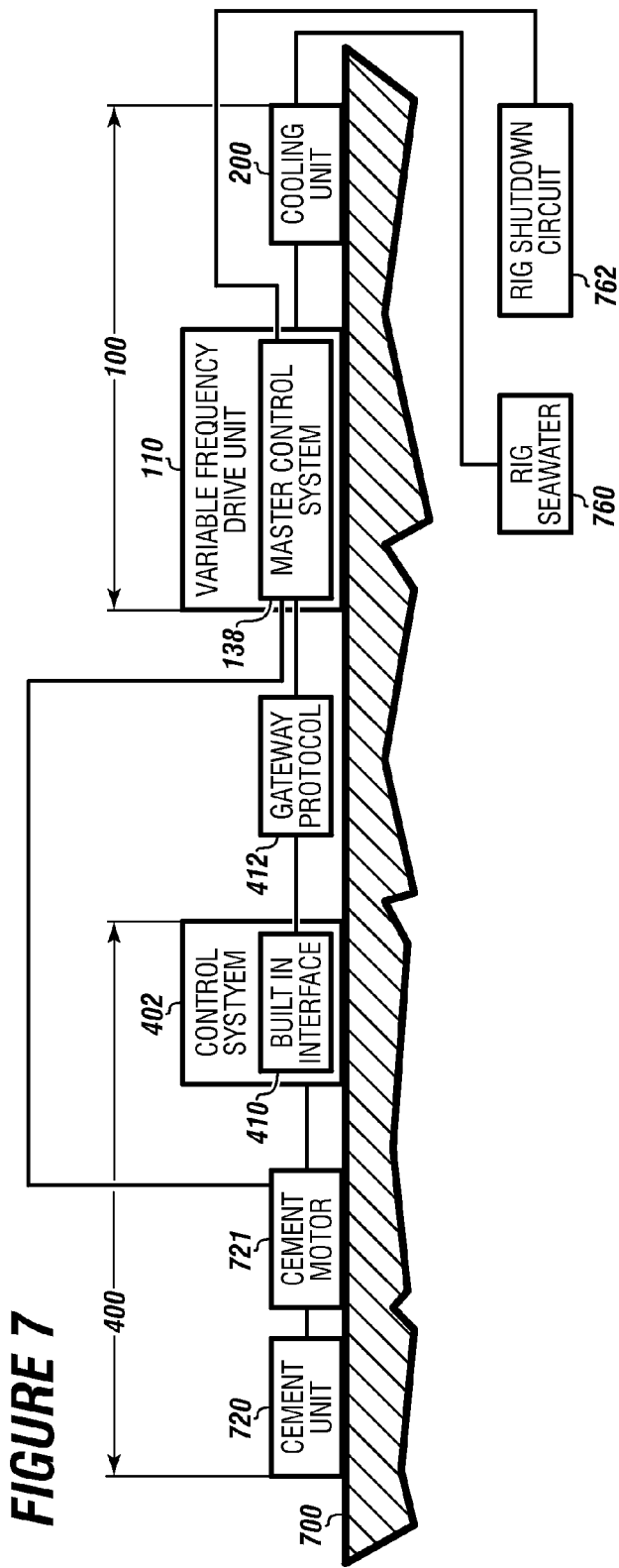
FIG. 7 depicts a schematic of the variable frequency drive system operatively installed on an offshore rig.

FIG. 7 depicts a schematic of the variable frequency drive system 100 operatively installed on an offshore rig.

The offshore rig 700 can have a cementing system 400. The cementing system can include a cement unit 720, a cement motor 721, and a control system 402. The cement unit 720 can be driven by the cement motor 721. The variable frequency drive system 100 can be located proximate to the cement motor 721. The fact that the variable frequency drive system 100 has a small footprint allows the variable frequency drive system 100 to be located at many places on the offshore rig 700 that conventional variable frequency drive units are not able to be installed. The variable frequency drive system 100 has a small footprint because the variable frequency drive unit 110 is sealed and has a high power density. The variable frequency drive system 100 can also be located on the offshore rig in many areas that conventional variable frequency drive system cannot be because the variable frequency drive system 100 is designed to have reduced interference with other components on the offshore rig.

The cooling unit 200 can be placed proximate or remote from the variable frequency drive unit 110. The modularity of the variable frequency drive system 100 further allows for more versatility in location of the variable frequency drive system 100 on the offshore rig 700.

The cement motor 721 can be controlled by the master control system 138.

The control system 402 can be in communication with the cement motor 721. The control system 402 can acquire operational data on the cement motor 721. The operational data can include temperature of the cement motor, the rotational speed of the cement motor, load on the cement motor, or the like.

The control system can have a built in interface 410. The built in interface 410 can be configured to communicate with the master control system 138 of the variable frequency drive unit 110 via one or more gateway protocols 412. The gateway protocols can be configured to handle any type of communication protocol.

A rig seawater 760 can be in communication with the cooling unit 200. A rig shutdown circuit 762 can be in communication with the master control system 138, for shutting down the variable frequency drive system 100 in an emergency or failure.

FIG. 8 depicts a schematic of the variable frequency drive system having multiple variable frequency drive units and cooling units.

A first variable frequency drive unit 110a and a second variable frequency drive unit 110b can be operatively installed on an offshore rig or the like.

A first cooling unit 200a and a second cooling unit 200b can be used to water cool components of the first variable frequency drive unit 110a and the second variable frequency drive unit 110b.

While these embodiments have been described with emphasis on the embodiments, it should be understood that within the scope of the appended claims, the embodiments might be practiced other than as specifically described herein.

What is claimed is:

1. A variable frequency drive system for use with a motor on an offshore platform, wherein the system comprises:
   a. a variable frequency drive unit comprising:
      (i) a climate controlled and sealed housing;
      (ii) a framework for insertion into the climate controlled and sealed housing, wherein the framework is modular;
      (iii) a power input connected with the climate controlled and sealed housing for receiving power;
      (iv) a power output connected with the climate controlled and sealed housing for transmitting power from the variable frequency drive unit;
      (v) a main circuit breaker disposed within the climate controlled and sealed housing, wherein the main circuit breaker is connected with the power input;
      (vi) a power converter module disposed within the climate controlled and sealed housing, wherein the power converter module is in communication with the main circuit breaker;
      (vii) an autoswitchable transformer connected with the power input and an auxiliary power system;
      (viii) an output filter disposed within the climate controlled and sealed housing, wherein the output filter is connected with the power converter module and the power output; and
      (ix) an air conditioning unit connected with the climate controlled and sealed housing, wherein the air conditioning unit is in electric communication with the auxiliary power system; and
   b. a cooling unit connected with the variable frequency drive unit comprising:
      (i) a heat exchanger configured to receive fresh water and to extract heat from the fresh water using seawater;
      (ii) a multistage centrifugal pump for providing pump head to fresh water in a fresh water inlet and providing the fresh water to the heat exchanger;
      (iii) a fresh water outlet configured to receive cooled fresh water from the heat exchanger, wherein the fresh water outlet is in fluid communication with the variable frequency drive unit;
      (iv) a mixing valve for controlling the amount of water from the fresh water inlet that is provided to the heat exchanger; and
      (v) a process logic controller connected to a pair of temperature probes for determining the temperature in the fresh water outlet and the fresh water inlet and adjusting the mixing valve to maintain the temperature in the fresh water outlet within a predetermined temperature range.

2. The variable frequency drive system of claim 1, wherein the power output is in communication with a cement pump.

3. The variable frequency drive system of claim 1, further comprising an input filter disposed within the climate controlled and sealed housing, wherein the input filter is connected with the main circuit breaker and the power converter module.

4. The variable frequency drive system of claim 3, further comprising a fuse set configured to protect the power converter module.

5. The variable frequency drive system of claim 3, further comprising a spill pan aligned with the input filter and the output filter.

6. The variable frequency drive system of claim 5, further comprising a drain that is in fluid communication with the spill pan and a leak detector, and wherein the leak detector trips the main circuit breaker upon detection of a leak.

7. The variable frequency drive system of claim 1, further comprising a control system in communication with the variable frequency drive unit, and wherein the control system is configured to adjust the variable frequency drive unit based on data acquired from the motor that is being controlled by the variable frequency drive unit.

8. The variable frequency drive system of claim 7, wherein the control system has a built in interface for communicating with a master control system through one or more gateway protocols.

9. The variable frequency drive system of claim 8, further comprising a first flow meter operatively disposed within the variable frequency drive unit for acquiring flow rate data on process water in the fresh water outlet, and wherein the first flow meter is in communication with the master control system.

10. The variable frequency drive system of claim 1, further comprising a second flow meter in the cooling unit, wherein the second flow meter is configured to acquire flow rate data on process water in the fresh water inlet.

11. The variable frequency drive system of claim 1, further comprising a de-airing valve disposed between the heat exchanger and the fresh water outlet.

* * * * *